Patented Jan. 9, 1923.

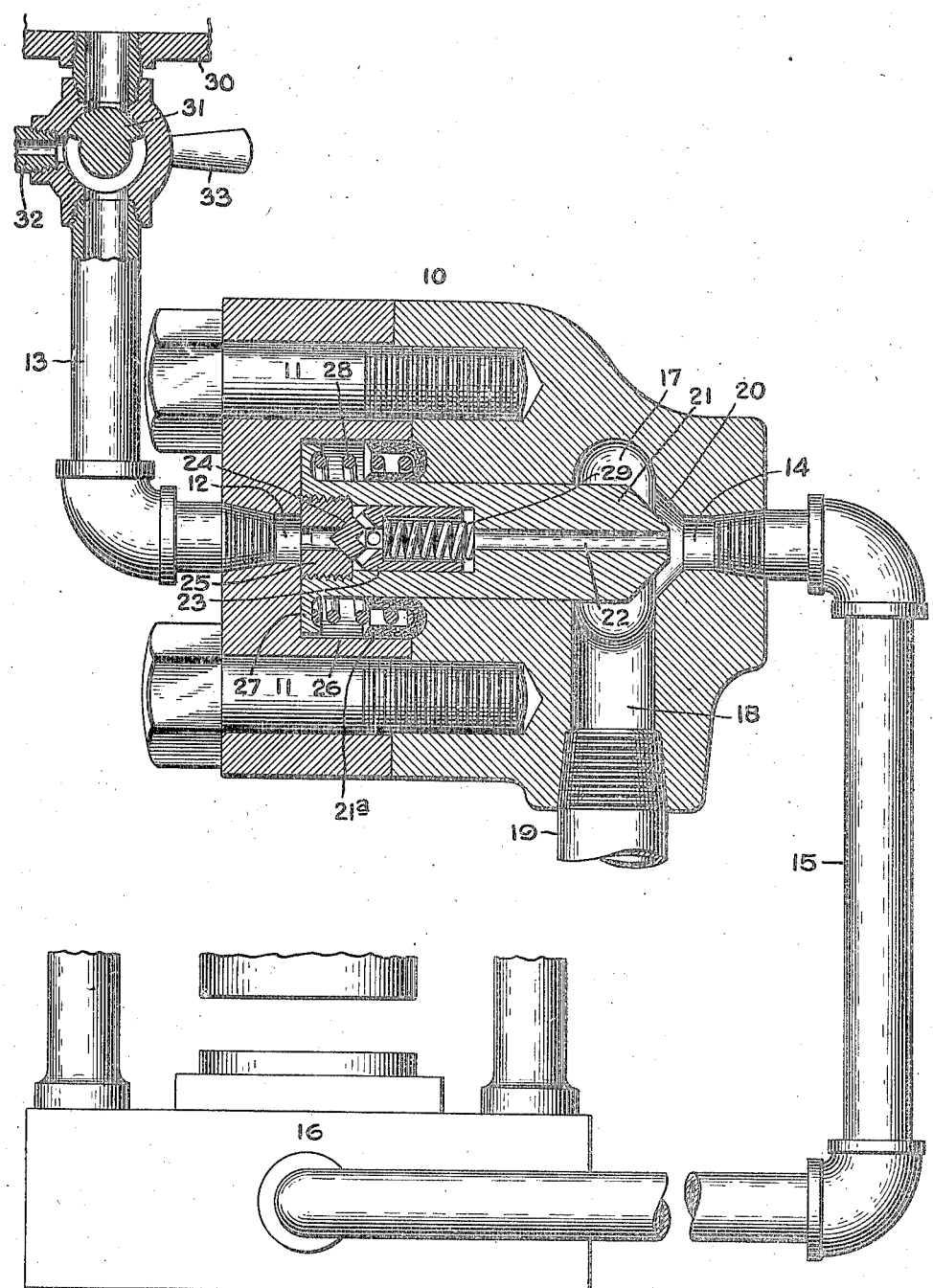

1,441,759

UNITED STATES PATENT OFFICE.

CHARLES F. SCHWENNKER, OF SCHENECTADY, NEW YORK, ASSIGNOR TO GENERAL ELECTRIC COMPANY, A CORPORATION OF NEW YORK.

VALVE.

Application filed March 4, 1920. Serial No. 363,334.

*To all whom it may concern:*

Be it known that I, CHARLES F. SCHWENNKER, a citizen of the United States, residing at Schenectady, county of Schenectady, State of New York, have invented certain new and useful Improvements in Valves, of which the following is a specification.

The present invention relates to valves, particularly to valves adapted for use in connection with hydraulically operated devices such as presses and the like, and has for its object to provide an improved valve structure for use in the pipe-line through which fluid is supplied to such a press, which is in the nature of a quick return valve and serves to control the connection of the fluid pressure to the press, its disconnection therefrom, and the quick relief of the pressure in the hydraulic device after an operation has been performed.

For a consideration of what I believe to be novel and my invention, attention is directed to the accompanying description and the claims appended thereto.

In the drawing, the figure is a view partly in section of a structure and arrangement embodying my invention.

Referring to the drawing, 10 indicates a valve casing which is made in two parts fastened together by bolts 11 in order to facilitate assembling. In valve casing 10 is an admission opening 12 to which is connected a supply pipe 13, and leading from casing 10 is a discharge opening 14 to which is connected a conduit 15 which leads to an hydraulic press or other fluid actuated device, a portion of which is indicated diagrammatically at 16. In valve casing 10 is also a chamber 17 from which leads a passage 18 connected to a waste conduit 19. Waste conduit 19 may discharge to any suitable point. Between chamber 17 and discharge passage 14 is a valve seat 20 adapted to be engaged by a valve 21 which valve is of substantial length and is guided in its movements by a cylindrical portion of valve casing 10. Extending through valve 21 is a passage 22, the lower end of which is counterbored to receive a valve 23 which seats on a seat 24, formed on the end of a nipple 25 which is threaded into the counterbored portion of passage 22. The left hand end of the valve casing is enlarged to form a chamber 26 in which is located a flange 27 formed integral with valve 21. Valve 21 is normally held away from its seat 20 by a spring 28 located in chamber 26, while valve 23 is normally held on its seat 24 by a spring 29. 21ª is a suitable packing located in chamber 26 for preventing leakage between valve 21 and the valve casing. Conduit 13 may lead from any suitable source of supply of fluid pressure such as a fluid pressure pipe-line as indicated at 30, or a suitable pump, and in it is a two-way valve 31 which in one position permits fluid from pipe-line 30 to flow through pipe 13 to the valve casing 10 and in another position cuts off communication between pipe 13 and supply conduit 30 and connects pipe 13 to a pressure relief pipe 32. Two-way valve 31 is shown in the present instance in a diagrammatic manner as comprising a simple rotary valve controlled by a hand lever 33, and this arrangement is to be taken as indicative of any suitable hand controlled valve arrangement for accomplishing the purpose intended.

When valve 31 is in the position shown in the drawing, the supply of fluid pressure from conduit 30 to pipe 13 is cut off and pipe 13 is connected to pressure relief pipe 32. The parts of the quick return valve will be in the positions shown in the drawing, valve 21 being held open by spring 28 so that conduit 15 is connected to discharge conduit 19, and valve 23 being held closed by spring 29. If now valve 31 is actuated to shut off communication between pressure relief pipe 32 and pipe 13 and connects fluid pressure pipe-line 30 to pipe 13, such fluid pressure will immediately act on the end of valve 21, moving the valve against the action of spring 28 to force valve 21 against its seat 20. This cuts off communication between discharge passage 18 and conduit 15. At substantially the same time, the fluid pressure opens valve 23 against the action of spring 29 and fluid under pressure will flow from pipe 13 through passage 22 to conduit 15 to operate the hydraulic device 16. As soon as the operation of the hydraulic mechanism is completed, two-way valve 31 is thrown back to the position shown in the drawing, whereupon the supply of fluid pressure to pipe 13 is cut off and such pipe is connected again to pressure relief pipe 32. This immediately relieves the pressure under piston 25 with the result that spring 29 quickly closes valve 23 and the spring 28 quickly opens valve 21. The fluid pressure from the hydraulic apparatus can now discharge through conduit 15 and passage 14 to chamber 17 and thence through passage 18 and discharge conduit 19. Fluid cannot, however, flow back through pipe 13 because of the closing of valve 23 which acts in substance as a non-return or check valve. The connection of conduit 15 to discharge conduit 19 gives a large area for the discharge of the fluid from the hydraulic device 16 and permits it to quickly return to its original position. It is therefore possible with the arrangement illustrated to obtain a very rapid discharge of an hydraulic device.

The arrangement also has the advantage that it is unnecessary for the hydraulic device to discharge through the manual valve which controls the flow of fluid pressure to the device, i. e., a valve such as the valve 31. This is of great advantage as the pressures dealt with are often very high and it is extremely difficult to obtain a valve of the manually operated type which will give efficient service when used for flow in both directions, and will not wear rapidly due to the flow through it. With the present arrangement, the reverse flow of fluid through the manually controlled valve 31 is only that necessary to relieve the pressure in pipe 13 which amounts to very little.

In accordance with the provisions of the patent statutes, I have described the principle of operation of my invention, together with the apparatus which I now consider to represent the best embodiment thereof, but I desire to have it understood that the apparatus shown is only illustrative, and that the invention may be carried out by other means.

What I claim as new and desire to secure by Letters Patent of the United States, is,—

1. The combination with an hydraulically operated device, of a valve casing, a conduit leading therefrom to said device, a discharge conduit connected to said casing, a normally open valve in said casing for controlling communication between said two conduits, a pressure conduit connected to said casing and adapted to supply fluid pressure to close said valve, conduit means connecting said pressure conduit to said first named conduit, and a non-return valve in said conduit means.

2. The combination with an hydraulically operated device, of a valve casing, a conduit leading therefrom to said device, a discharge conduit connected to said casing, a normally open valve in said casing for controlling communication between said two conduits, a pressure conduit connected to said casing and adapted to supply fluid pressure to close said valve, a passage which extends axially of said valve, and a normally closed valve in said passage which permits the flow of fluid through it toward said device but prevents flow of fluid in the reverse direction.

3. The combination with an hydraulically operated device, of a valve casing, a conduit leading therefrom to said device, a discharge conduit connected to said casing, a normally open valve in said casing for controlling communication between said two conduits, a piston connected to said valve, a cylinder in which it moves, a pressure conduit connected to said cylinder for admitting fluid pressure thereto to close said valve, conduit means connecting said pressure conduit to said device, and a non-return valve for preventing flow therethrough in a reverse direction.

4. The combination with an hydraulically operated device, of a valve casing, a conduit leading therefrom to said device, a discharge conduit connected to said casing, a normally open valve in said casing for controlling communication between said two conduits, a pressure conduit connected to said casing and adapted to supply fluid pressure to close said valve, a passage which extends axially of said valve; and a normally closed valve in said passage which permits the flow of fluid through it toward said device but prevents flow of fluid in the reverse direction, a source of fluid supply, a pressure relief pipe, and valve means for connecting said pressure conduit to said source or to said relief pipe.

In witness whereof, I have hereunto set my hand this 2nd day of March, 1920.

CHARLES F. SCHWENNKER.